Oct. 16, 1962 D. L. SMITH 3,058,628
FREE FLOWING CONDIMENT DISPENSER
Filed March 14, 1960
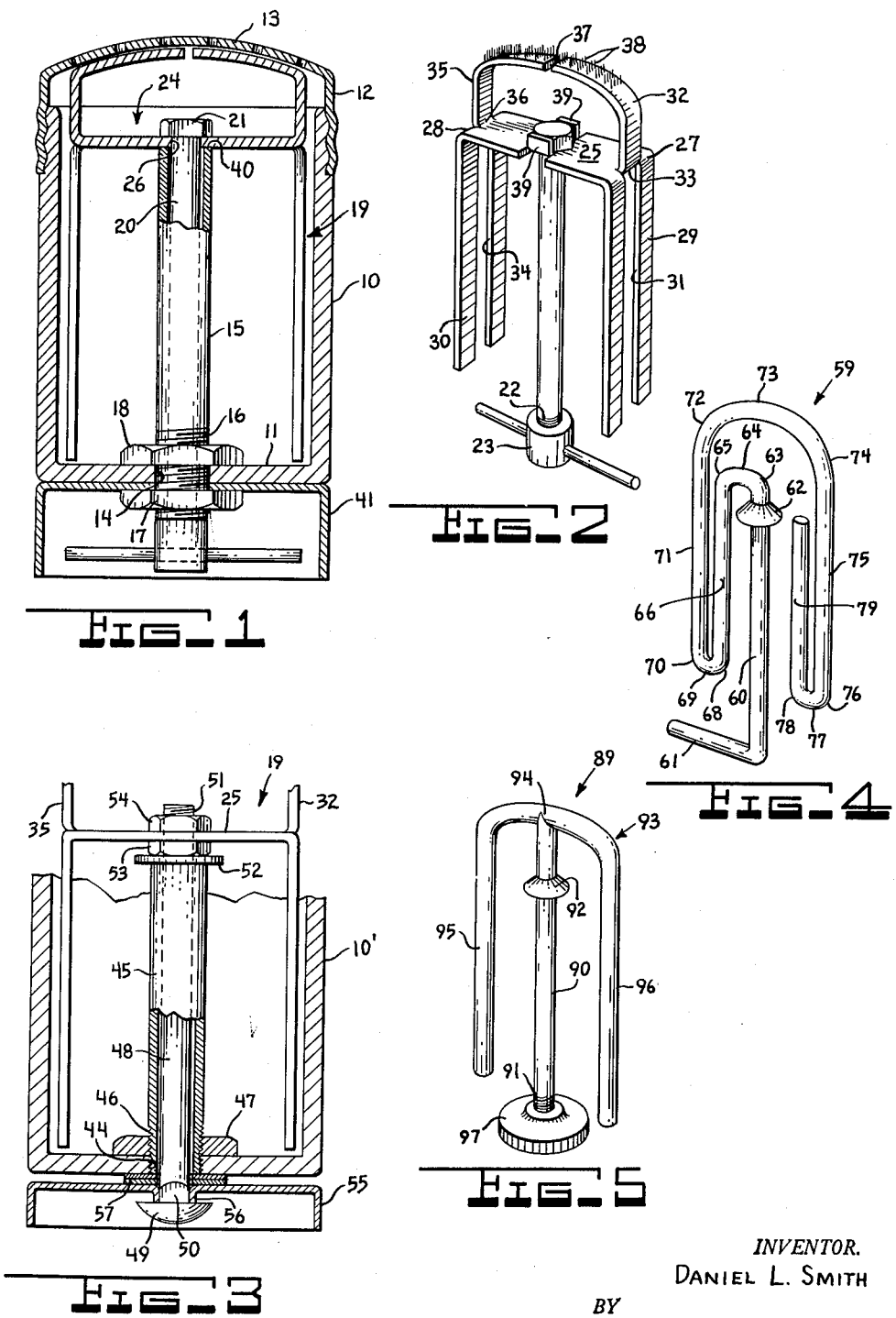
INVENTOR.
DANIEL L. SMITH
BY
Harold B. Hood
ATTORNEY

United States Patent Office 3,058,628
Patented Oct. 16, 1962

3,058,628
FREE FLOWING CONDIMENT DISPENSER
Daniel L. Smith, Fort Myers, Fla., assignor to Daniel L.
Smith, trustee, Fort Myers, Fla.
Filed Mar. 14, 1960, Ser. No. 14,969
7 Claims. (Cl. 222—242)

The present invention relates to a free flowing condiment dispenser, and the primary object of the invention is to provide an improved device whereby discrete material such as, for instance, sugar, salt, pepper and the like may be freed or kept free from lumping, caking, etc. as a result of high humidity or for any other reason.

A further object of the invention is to provide, in such a device, an agitator and/or scraper so supported within a dispensing container as to be effective to accomplish its intended purpose and yet to be wholly independent of the foraminous wall of the container through which the discrete material is adapted to be dispensed.

In most shaker dispensers, the foraminous wall is provided by a removable cover closing the upper end of the container through which the container is adapted to be filled. It is an important object of the present invention to provide agitator, breaker or scraper mechanism which is wholly supported in complete independence of such a removable cover for the container.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a vertical section through a shaker dispenser constructed in accordance with the present invention, certain of the internal parts being shown in broken elevation;

FIG. 2 is a perspective view of the agitator and scraper mechanism shown in FIG. 1;

FIG. 3 is a similar section through a slightly modified construction;

FIG. 4 is a perspective view of a different form of agitator; and

FIG. 5 is a similar view of still another form of agitator.

Referring more particularly to FIGS. 1 and 2, it will be seen that I have illustrated a container 10 having a bottom wall 11 and a removable cover 12 for the open top of said container, said cover providing a foraminous wall 13 through the openings in which discrete material is adapted to be dispensed from the container. Desirably, but not necessarily, the container 10 will be generally cylindrical.

A port 14 is centrally formed in the bottom wall 11 of said container and an elongated, tubular bearing sleeve 15 is mounted in the container with its lower end extended through said port 14, the lower end of said sleeve being externally threaded as indicated at 16. The port 14 is not threaded but is slightly oversize with respect to the diameter of the lower end of the sleeve 15. A nut 17 is threadedly mounted on the projecting end portion of the sleeve 15 and a companion nut 18 is threadedly mounted on said sleeve end within the container 10 to bear upon the upper surface of the bottom wall 11 thereof. Thereby, the sleeve 15 may be fixedly secured to the container wall 11 to project upwardly within said container into proximity to the cover wall 13. It will be obvious that, by suitable manipulation of the nuts 17 and 18, the sleeve 15 may be axially adjusted within the container for a purpose which will appear.

An agitator, indicated generally by the reference numeral 19, is mounted within the container 10. Said agitator comprises a stem 20 formed at its upper end with a head 21, and said stem is mounted for oscillation or rotation within the sleeve 15, being wholly supported by said sleeve and extending beyond both the upper and the lower ends of said sleeve. The lower end of the stem 20 is externally threaded as at 22 for the reception of a suitable manipulating element 23; and it will be perceived that said element 23 may be so positioned as to abut the lower end of the sleeve 15 whereby, in cooperation with the head 21, said element 23 restrains the stem 20 against substantial axial movement relative to the sleeve 15.

The agitator further comprises stirring and scraper means indicated generally by the reference numeral 24. In this form of the invention, said stirring and scraper means are formed from a single piece of strip material such as sheet metal or relatively stiff synthetic plastic material. Said strip is formed to provide a central, flat table section 25 formed with a central opening 26 through which the element 24 may be sleeved on the stem 20 to be positioned between the upper end of the bearing 15 and the head 21. The table 25 has one dimension transverse with respect to the axis of the stem 20 which is substantially equal to the transaxial dimension of the foraminous wall 13; but its perpendicular transaxial dimension is substantially less than that of said wall. Said table projects oppositely radially from the axis of the stem 20 and, at the point 27, one end of the strip is turned downwardly to define a finger 29 disposed closely adjacent the side wall of the container 10 and extending into close proximity to the bottom wall 11 thereof. At the point 28, the opposite end of the strip is similarly turned downwardly to define a similar finger 30.

The finger 29 is longitudinally slashed as at 31 to define an intermediate finger 32 which, as clearly shown in FIGS. 1 and 2, is turned upwardly at 22 and then radially inwardly. The finger 30 is similarly slashed as at 34 to define still another finger 35 which is turned upwardly at 36 and then radially inwardly. The parts are so proportioned and designed that the inturned ends of the fingers 32 and 35 substantially meet at 37 and cooperate to define scraper means so located with respect to the wall 13 that, upon oscillation of the agitator means 19, the scraper means comprising the fingers 32 and 35 will act to dislodge caked material from the inner surface of the wall 13. Of course, at the same time, movement of the fingers 29 and 30 within the container 10 will tend to disintegrate any caking within the mass of material in the container.

As shown, and in accordance with somewhat conventional practice, the wall 13 is slightly domed; and the distal portions of the fingers 32 and 35 are shaped to conform to whatever contour is selected for that wall. If desired, the distal portions of those fingers may be provided with an arrangement of bristles 38 which may be either natural or synthetic stiff fibers or may be resiliently flexible wires. Where such bristles are used, as suggested in FIG. 2, the distal portions of the fingers 32 and 35 will, of course, be spaced slightly below the inner surface of the wall 13 so that the tip portions of the bristles 38 will scrape the inner surface of the wall 13 and will, at least to some extent, penetrate the dispensing openings in said wall.

Suitable means is provided for establishing a rotary driving connection between the stem 20 and the agitator 19; and, as suggested in FIGS. 1 and 2, such means may comprise a pair of ears 39, 39, turned up from the material of the table 25 into engagement with the non-circular perimeter of the stem head 21.

It will be seen that, as the element 23 is threadedly turned onto the lower end of the stem 20, it abuts the lower end of the bearing sleeve 15 to draw the table portion 25 of the agitator into closing, bearing engagement with the otherwise-open mouth 40 of the passage through the sleeve 15, whereby leakage of material contained within the receptacle 10 through the sleeve 15 is prevented. A base 41, housing the manipulating element 23, is preferably clamped to the receptacle 10 through the medium of the nut 17.

In FIG. 3, I have shown a somewhat modified arrangement in which the opening 44 in the bottom wall of a container 10′ (otherwise identical with the container 10) is internally threaded and the lower end of a bearing sleeve 45 is externally threaded as at 46 to be threadedly mounted in said opening, a jam nut 47 being provided to bear upon the inner surface of the bottom wall of the container. In this form of the invention, the stem 48 is formed at its lower end with a head 49 and, just above said head, is formed with a non-circular portion 50. The upper end of the stem is threaded as at 51 and a washer disc 52 is sleeved on said stem to bear upon and close the upper end of the sleeve 45. A nut 53 threadedly mounted on the stem portion 51 bears on the washer 52; and the table 25 of the agitator means 19 is sleeved on said stem and is clamped thereon between the nut 53 and a second nut 54.

A manipulator shell 55 is formed with a central opening bounded by a non-circular flange 56 which bears upon the portion 50 of the stem to establish a rotational driving connection between the manipulator element and said stem; and a pair of washers 57 is confined between the element 55 and the base of the container 10′ to provide a friction-reducing bearing.

The operation of the form of invention illustrated in FIG. 3 is directly analogous to that above described in connection with FIGS. 1 and 2.

In FIG. 4, I have illustrated another form of agitator means indicated generally by the reference numeral 59. In this form, the agitator means comprises a single, integral length of metal or plastic rod including a rectilinear section 60 adapted to be oscillably supported in the bearing sleeve 15 or 45. Said section 60 projects oppositely from the ends of the bearing sleeve and a section 61 is turned radially outwardly from the axis of the section 60 to act as manipulator means disposed below the bottom wall of the container. A collar 62 is fixedly carried by the section 60 near its upper end to bear upon and close the upper end of the bearing sleeve 15 or 45. Immediately above the collar 62, the rod is turned radially outwardly, as at 63, to define a radial section 64, beyond which the rod is turned downwardly as at 65 to define a vertical section 66 lying parallel to, but radially spaced in one direction from, the section 60. The portion 66 is proportioned and designed to extend into proximity to the bottom wall of the container 10 or 10′, and there is turned radially outwardly, as at 68, to define a short radial section 69. Thence, the rod turns upwardly as at 70 to define a section 71 lying parallel to, and in a common plane with, the sections 60 and 66 and extending upwardly into proximity to the container wall 13. Now, the rod is turned radially inwardly, as at 72, to define a scraper section 73 which is shaped to conform generally to the contour of the wall 13 and is disposed in coactive relation to that wall to dislodge caked material therefrom. If desired, the rod section 73 may be provided with bristles similar to the bristles 38.

The section 73, preferably lying in a common plane with the sections 60, 66 and 71, extends beyond the axis of the section 60 and is turned downwardly as at 74 to define a finger 75 parallel with the section 60 but radially offset therefrom in a direction opposite to the direction of offset of the finger 66. The finger 75 extends downwardly into proximity to the bottom wall of the container and there is turned radially inwardly as at 76 to define a short radial section 77. Thence, the rod turns upwardly as at 78 to define a substantially vertical section 79 which is coplanar with, and parallel to, the sections 60, 66, 71 and 75.

The agitator 59, of course, is manipulable through the medium of the projecting radial portion 61 and its mode of operation and effect are analogous to those described in connection with FIGS. 1 to 3.

In FIG. 5 I have shown a still further form of agitator means indicated generally by the reference numeral 89. In this form, a rod 90 is oscillably supported in the bearing 15 or 45 and projects beyond the opposite ends thereof. Its lower end 91 is threaded for the reception of a manipulator disc 97 which, when the agitator is assembled with a container 10 or 10′, is disposed outside the bottom wall of the container and bears against the lower end of the bearing 15, or against washers like the washers 57, to hold the collar 92, fixedly carried near the upper end of the stem 90, in closing, bearing engagement with the upper end of the sleeve 15 or 45. At its upper extremity, the stem 90 carries an agitator means indicated generally by the reference numeral 93, said agitator means being in the form of an inverted U-shaped rod with the median point of its base cope welded or otherwise secured to the extremity of the rod 90, as at 94. The opposite legs 95 and 96 of the agitator extend, in oppositely spaced parallelism with the rod 90, into proximity to the bottom wall of the container, and the base of the U-shaped agitator element may be disposed in scraping relation with the wall 13 or may, if desired, carry bristles similar to the bristles 38. The agitator means of FIG. 5 may be oscillated about the axis of the sleeve 15 or 45, by manipulation of the exposed element 97, to perform a function entirely analogous to that described in connection with FIGS. 1 to 4.

I claim as my invention:

1. A condiment dispenser comprising an upstanding container having a bottom wall and a foraminous top wall through which a discrete material is to be dispensed, an elongated tubular bearing fixed to said bottom wall in an opening therethrough and extending, within said container, into proximity to said top wall, an agitator means, said agitator means comprising a stem mounted in and wholly supported by said bearing for turning movement about the axis thereof, said stem extending beyond both ends of said bearing, stirring means supported from that end of said stem which extends beyond the inner end of said bearing, said stirring means including a portion disposed adjacent a side wall of said container and extending downwardly into proximity to said bottom wall, and scraper means carried by the same end of said stem and extending into cooperative association with said foraminous wall to dislodge caked material from the inner surface of said foraminous wall, and manipulable means carried by that portion of said stem which projects beyond the outer end of said bearing, said bearing means extending through a central opening in said bottom wall and being externally threaded both above and below said bottom wall, clamp nuts threadedly mounted on said bearing above and below said bottom wall to secure said bearing in place relative to said container, and said agitator means including a horizontally-disposed portion supporting said stirring means and bearing upon the upper end of said bearing to close the same.

2. A condiment dispenser comprising a container having a perforate wall through which a discrete material is to be dispensed, said container having a wall opposite said perforate wall and formed with an opening therethrough, an elongated tubular bearing fixed to said opposite wall, passing through said opening and extending, within said container, into proximity to said perforate wall, an agitator, said agitator comprising a stem mounted in and wholly supported from said tubular bearing for turning movement about the axis thereof, said stem extending beyond both ends of said bearing, and stirring means carried by that portion of said stem which extends beyond the inner end of said bearing, said stirring means having a portion disposed radially outwardly from said bearing within said container and projecting toward said opposite wall, means retaining said stem against substantially axial movement relative to said bearing, and manipulable means carried by that portion of said stem which projects beyond the outer end of said bearing, scraper means carried by said stem, said scraper means including an arrangement of bristles extending into scraping engagement with the inner surface of said perforate wall, said stirring means being formed from a single piece of strip material having a centrally-perforated, flat table portion penetrated by said stem and extending oppositely therefrom into proximity to the side walls of said container and terminating, at its opposite ends, in downturned fingers extending substantially to the bottom wall of said container, said scraper means being provided by other fingers upwardly and then radially-inwardly turned into substantially meeting relation at their distal ends, from the material of said table portion.

3. The device of claim 2 in which the upper end of said stem is provided with a head bearing upon the upper surface of said agitator table portion to retain said table portion in closing engagement with the inner end of said bearing, the lower end of said stem being threaded and said manipulating means being threadedly mounted on the lower end of said stem in abutment with means fixed relative to said container bottom wall to restrain said stem against substantial axial movement relative to said bearing.

4. A condiment dispenser comprising an upstanding container having a bottom wall and a foraminous top wall through which a discrete material is to be dispensed, said bottom wall being centrally formed with a threaded opening therethrough, an elongated tubular bearing having its lower end threadedly secured in said opening and extending, within said container, into proximity to said top wall, an agitator, said agitator comprising a stem mounted in and wholly supported by said bearing for turning movement about the axis thereof, said stem extending beyond both ends of said bearing, stirring means carried by that end of said stem which extends beyond the inner end of said bearing, said stirring means including a portion disposed adjacent a side wall of said container and extending downwardly into proximity to said bottom wall, and scraper means carried by the same end of said stem and extending into cooperative association with said foraminous wall to dislodge caked material from the inner surface of said foraminous wall, the lower end of said stem being non-circular in cross section, and manipulable means drivingly mounted on said lower end of said stem.

5. A condiment dispenser comprising an upstanding container having a bottom wall and a foraminous top wall through which a discrete material is to be dispensed, said bottom wall being centrally formed with a threaded opening therethrough, an elongated tubular bearing having its lower end threadedly secured in said opening and extending, within said container, into proximity to said top wall, an agitator, said agitator comprising a stem mounted in and wholly supported by said bearing for turning movement about the axis thereof, said stem extending beyond both ends of said bearing, stirring means carried by that end of said stem which extends beyond the inner end of said bearing, said stirring means including a portion disposed adjacent a side wall of said container and extending downwardly into proximity to said bottom wall, and scraper means carried by the same end of said stem and extending into cooperative association with said foraminous wall to dislodge caked material from the inner surface of said foraminous wall, the lower end of said stem being non-circular in cross section, and manipulable means drivingly mounted on said lower end of said stem, said stirring means being formed from a single piece of strip material having a centrally-perforated, flat table portion penetrated by said stem and extending oppositely therefrom into proximity to the side walls of said container and terminating, at its opposite ends, in downturned fingers extending substantially to the bottom wall of said container, said scraper means being provided by other fingers upwardly and then radially-inwardly turned into substantially meeting relation at their distal ends, from the material of said table portion.

6. The device of claim 5 in which the upper end of said stem is threaded, washer means sleeved on said upper stem end and bearing on the inner end of said bearing to close the same, a nut threaded on said upper stem end above said washer means and bearing thereon to restrain said stem against substantial axial movement relative to said bearing, said stirring means being supported from said nut, and another nut threaded on said upper stem end above said stirring means and bearing thereon to secure said stirring means to said stem.

7. A condiment dispenser comprising an upstanding container having a bottom wall provided with an opening therethrough and a foraminous top wall through which a discrete material is to be dispensed, an elongated tubular bearing fixed to said bottom wall, passing through said opening and extending, within said container, into proximity to said top wall, an agitator, said agitator comprising a continuous rod having an intermediate portion of its length journalled in said bearing, a lower section of said rod being angularly related to said intermediate portion and disposed outside said container, a collar fixed to said rod and bearing on the upper end of said bearing to close the same and cooperating with said lower rod section to restrain said rod against substantial axial movement relative to said bearing, the upper portion of said rod being turned radially and then downwardly to define a first finger radially offset in one direction from, and substantially parallel with, said intermediate rod portion, then being turned again radially outwardly and then upwardly and extending substantially parallel with said first finger to a level above said first radially-turned portion, then being turned radially inwardly to cross the axis of said intermediate rod portion, then being turned downwardly to define a second finger radially offset in the opposite direction from, and substantially parallel with, said intermediate rod portion, and then being turned radially inwardly and then upwardly to provide a terminal section lying between and substantially parallel with said intermediate rod portion and said last-named finger.

References Cited in the file of this patent

UNITED STATES PATENTS

| | | |
|---|---|---|
| 212,518 | Sellers | Feb. 18, 1879 |
| 574,019 | Bush | Dec. 28, 1896 |
| 732,214 | Overbaugh | June 30, 1903 |
| 737,267 | Overbaugh | Aug. 25, 1903 |
| 909,657 | Patterson | Jan. 12, 1909 |
| 1,110,383 | Flanagan | Sept. 15, 1914 |
| 2,083,624 | Watson | June 15, 1937 |